Dec. 27, 1955   E. W. CLARKE   2,728,457
PHASE SEPARATION PROCESS AND APPARATUS
Filed Sept. 14, 1951   8 Sheets-Sheet 1

Fig. 1

ATTEST
J. D. Peterson

INVENTOR.
EDGAR W. CLARKE
BY Norbert E. Birch
ATTORNEY

Dec. 27, 1955  E. W. CLARKE  2,728,457
PHASE SEPARATION PROCESS AND APPARATUS
Filed Sept. 14, 1951  8 Sheets-Sheet 2

ATTEST
J. D. Peterson

INVENTOR.
EDGAR W. CLARKE
BY Norbert E. Birch
ATTORNEY

Dec. 27, 1955   E. W. CLARKE   2,728,457
PHASE SEPARATION PROCESS AND APPARATUS
Filed Sept. 14, 1951   8 Sheets-Sheet 3

Fig. 4

ATTEST

J. D. Peterson

INVENTOR.
EDGAR W. CLARKE
BY Norbert E. Birch
ATTORNEY

Dec. 27, 1955  E. W. CLARKE  2,728,457
PHASE SEPARATION PROCESS AND APPARATUS
Filed Sept. 14, 1951  8 Sheets-Sheet 4

ATTEST
J. D. Peterson

INVENTOR.
EDGAR W. CLARKE
BY Norbert E Birch
ATTORNEY

Dec. 27, 1955  E. W. CLARKE  2,728,457
PHASE SEPARATION PROCESS AND APPARATUS
Filed Sept. 14, 1951  8 Sheets-Sheet 5

ATTEST

J. D. Peterson

INVENTOR.
EDGAR W. CLARKE
BY Norbert E. Birch
ATTORNEY

Dec. 27, 1955 E. W. CLARKE 2,728,457
PHASE SEPARATION PROCESS AND APPARATUS
Filed Sept. 14, 1951 8 Sheets-Sheet 6

ATTEST
J. D. Peterson

INVENTOR.
EDGAR W. CLARKE
BY Norbert E. Birch
ATTORNEY

Dec. 27, 1955   E. W. CLARKE   2,728,457
PHASE SEPARATION PROCESS AND APPARATUS
Filed Sept. 14, 1951   8 Sheets-Sheet 7

Fig. 11

ATTEST
J. D. Peterson

INVENTOR.
EDGAR W. CLARKE
BY Norbert E. Burch
ATTORNEY

Dec. 27, 1955                E. W. CLARKE                2,728,457
PHASE SEPARATION PROCESS AND APPARATUS
Filed Sept. 14, 1951                               8 Sheets-Sheet 8

Fig. 12

ATTEST

J. D. Peterson

INVENTOR.
EDGAR W. CLARKE
BY Norbert E. Birch
ATTORNEY

United States Patent Office 2,728,457
Patented Dec. 27, 1955

2,728,457

PHASE SEPARATION PROCESS AND APPARATUS

Edgar W. Clarke, Laurel Springs, N. J., assignor to The Atlantic Refining Company, Philadelphia, Pa., a corporation of Pennsylvania Application September 14, 1951, Serial No. 246,625

14 Claims. (Cl. 210—51)

This invention relates generally to a method and apparatus for the phase separation of fluid mixtures. In one preferred embodiment, this invention relates to a novel method and apparatus for liquid-liquid or liquid-solid extraction.

There are a multitude of commercial processes which in one manner or another are faced with the problem of resolving a fluid mixture or system of two or more separable phases. For instance, such separation problems occur most frequently in those processes which utilize liquid-liquid extraction or liquid-solid extraction. It is probable that the petroleum industry employs these processes more extensively than any other industry. For example, in petroleum refining such processes would include de-asphalting of crude residua with propane, refining of lubricating oil stocks with phenol, furfural, chlorex, nitrobenzene, or with double solvents such as are used in the Duo-sol process; extraction of cycle stocks from a catalytic cracking unit with selective solvents to remove materials which would ordinarily coke upon recycling; removal of mercaptans or gum-forming compounds from naphthas with caustic methanol; extraction of sulfonic acids from acid sludges with solvents such as benzene; and similar processes. All these types of extraction involve the refining of the charge stock through a separation of desirable from undesirable materials by the selective action of a solvent. In general, a certain amount of undesirable material is not extracted from the layer containing the desirable material and some desirable material is lost in the undesirable layer.

Specific examples of liquid-solid extraction, liquid-liquid extractions, and allied separation problems of interest to industries other than the petroleum industry are: extraction of metals or metallic compounds from their ores; such as gold, copper or copper salts, radium salts, uranium oxide or uranium salts, iron oxide, etc., from their corresponding ores, extraction of vegetable oil, extraction of animal or fish oils, extraction of waste products of slaughter houses or rendering plants, extraction of pharmaceutical preparations, extraction of ligneous portions of wood from the digester liquor containing the cellulose fibers of wood pulp, extraction of organic wastes, extraction of enzynes from organic media, extraction of living organisms such as yeasts, bacteria, and molds from culture solutions, extraction of starch and/or oil from corn, wheat, rye, rice or potatoes, extractive revivification of silica gel, extractions of essential oils and flavors, extraction of natural waxes, extraction of anthracene from anthracene oil, extraction of the products of the distillation of low-grade coal or wood, and extraction of the products of the thermal treatment of oil-bearing shales.

Several problems are characteristic of all phase separation processes and particularly extraction processes. For example, in solvent extraction processes, aside from the power and selectivity of the solvent, three things are of prime importance, namely, (1) thorough mixing between the solvent medium and the material to be extracted, (2) maximum flow rates per unit volume of separating and settling apparatus, and (3) complete and sharp settling and separation of the extract and raffinate phases. These factors are related to one another to a considerable extent in that maximum flow rates are primarily limited to that at which optimum settling and separation of the phases occurs.

In greater detail, in any extraction process, mixing between the solvent medium and the liquid or solid to be extracted is extremely important since the solvent cannot adequately fulfill its function unless the solvent medium can intimately contact and penetrate every portion of the material to be extracted. This aspect of extraction presents few or no problems since the pumps, agitators, baffles, etc., now available on the market perform this function in an extremely efficient manner.

However, the other two problems of extraction, namely, settling and separation of the extract and raffinate phases and maximum flow rates, present problems which have severely limited the efficiency and economics of extraction processes. Actually, in every case the maximum flow rate permissible in extraction process or apparatus is not an independent factor, but, instead depends almost entirely upon the rate at which the extract and raffinate phases settle and separate from one another. In other words, the maximum flow rate is limited to that rate at which the two phases settle and separate from one another in an efficient manner. In reality then, the only problem involved in extraction besides mixing, is the problem of efficiently settling and separating the extract and raffinate phases.

Although the problem of settling and separation may, at first glance, appear to be merely a simple matter of allowing the extract and raffinate phases to settle and separate by virtue of their difference in specific gravities, much more in fact is involved.

There are two very distinct methods employed in the art for settling and separating a fluid mixture of phases which can generally be characterized by whether the fluid mixture of phases is flowing in a horizontal or vertical direction when passing through the settling and separation zone. In other words, if the entire fluid mixture of phases is flowing in a generally vertical direction when the fluid mixture of phases is disengaging or settling and separating from one another due to the action of gravitational forces, such a process can be designated as a "vertical flow" type of phase separation process. On the other hand, if the entire fluid mixture of phases is flowing in a generally horizontal direction when the fluid mixture of phases is disengaging or settling and separating from one another due to the action of gravitational forces, such a process can be designated as a "horizontal flow" type of phase separation process.

The "vertical flow" type of extraction unit usually consists of a series of vertically superimposed mixing zones and settling and separation zones wherein the solvent and material to be extracted are alternately mixed in a mixing zone and then allowed to more or less separate so that the extract phase usually gravitates toward the bottom of the extraction tower or column and the raffinate phase gradually rises to the upper portion of the vertical extraction tower or column.

In a "horizontal flow" type of settling and separation zone, the phases enter one end of a horizontally disposed chamber and usually flow toward a weir-type device which is somewhat similar to a vertical wall disposed in the form of a dam whereby the upper raffinate phase spills over the top of the weir and the lower extract layer is drawn off at a point adjacent the bottom of the vertical wall or dam. It should be pointed out here that the instant invention is directed to "horizontal flow" type of phase separation process rather than the "vertical flow" type of process.

Various refinements have been suggested to improve these two types of extraction units, but for the most part, these suggested modifications have not been adopted commercially due to their inherent undesirable features. For instance, one recent patent has suggested an improvement to the horizontal type of extraction apparatus wherein the solvent and material to be extracted are passed in a substantially horizontal stream through the apparatus, by placing a number of tubes in the settling and separation zone to facilitate settling and separation of the extract and raffinate phases. Although this suggested modification has some merit over settling and separation zones without tubes, it still fails to achieve the desired highly efficient settling and separation because the materials leaving the outlet ends of the tubes cascade both upwardly and downwardly with the result that much of the beneficial separation and settling of the extract and raffinate phases accomplished in the tubes themselves is, to a large extent, nullified due to the remixing of these separated phases at the outlet ends of these tubes. This apparatus suffers from a further deficiency in that when it is desired to extract tarry or asphaltic materials from a charge stock, the tube-like structures placed in the settling and separation zone are susceptible to plugging with the very probable end result that the tubes will plug so completely that the process will have to be discontinued while the tubes are removed and cleaned. This type of apparatus is, therefore, highly unsuitable for any type of extraction that involves either the handling of solid particles such as masses of solid wax encountered in the nitrobenzene extraction of lubricating oil distillate stocks, or for extractions that involve the handling of sticky materials such as the asphaltenes that are present in phenol extraction of lubricating oil residuum stocks, or in propane deasphalting, or in solvent extraction of oil solutions of polyvalent metal sulfonates, or in separation of resins from asphaltenes, or in improvement of asphalt quality by partial separation of the asphaltenes from the waxes, oils, and resins, or for all like cases.

The mixing steps and the settling and separation steps are of the utmost importance in any extraction process because the number of theoretical stages which can be achieved is directly dependent upon the efficiency of these steps. A simplified definition of a theoretical stage in an extraction process is a stage wherein both (1) perfect mixing between the solvent medium and the charge stock occurs, and (2) perfect settling and separation of the extract and raffinate phases occurs.

In the extraction art, an actual stage means the number of actual mixing chambers and settling and separation chambers which are present in an apparatus and this is always a fixed number which cannot be varied once the extraction apparatus is constructed. Almost without exception, the number of theoretical stages in an extraction apparatus is less than the number of actual stages. The primary reason for this is that all of the actual extraction stages do not accomplish perfect settling and separation between the extract and raffinate phases. For instance, an extraction unit having between 10 and 15 actual extraction stages may only be equivalent to 4 or 5 theoretical extraction stages. As an example, in the plant scale nitrobenzene extraction of lubricating oils, five actual stages have been found to be the maximum number which are economically feasible, and they correspond closely to three theoretical stages. It is a well recognized fact in the solvent refining of petroleum oils, that more than seven theoretical stages is practically never economical due to the fact that so many actual stages must be used in order to obtain the seven theoretical stages.

As has been stated above, in any extraction process, a portion of the desirable material in the charge stock will be retained in the extract phase and a portion of the undesirable material in the charge stock will be retained in the raffinate phase. It is highly desirable that the final extract phase shall contain a minimum amount of the desirable material in the charge stock and that the final raffinate phase shall contain a minimum amount of the undesirable material in the charge stock. The extent to which this desirable condition of operation can be accomplished depends for the most part upon the number of theoretical stages which are obtainable in the extraction process. The higher the number of theoretical stages in an extraction process, the easier it is for one to obtain the desired purity and distribution of components in the extract and raffinate phases. As has also been stated previously, present extraction processes are severely restricted in this respect in that despite a large number of actual stages in an extraction unit, comparatively few theoretical stages are obtained. For instance, in the solvent extraction of lube oils, where only about five theoretical stages are obtainable with present extraction apparatus, a considerable portion of the desirable oil in the charge stock is retained in the extract phase and a portion of the undesirable asphaltic material in the lube oil charge stock is retained in the raffinate phase. This undesirable condition and resulting losses have more or less been accepted by the industry as an inherent and unavoidable feature of extraction processes since there heretofore did not appear to be any feasible way of economically increasing the number of theoretical stages.

It is, therefore, the object of this invention to provide an improved process and apparatus for settling and separating a fluid mixture of phases.

It is also an object of this invention to provide an apparatus and process for liquid-liquid or liquid-solid extraction whereby a high rate of flow can be maintained without contaminating the extract and raffinate phases with each other.

It is a further object of this invention to provide a highly efficient extraction apparatus and process wherein each actual stage closely approximates a theoretically perfect stage of extraction.

Other further and more specific objects of this invention will become apparent to persons skilled in the art from a consideration of the following description when taken in conjunction with the accompanying drawings wherein there is illustrated diagrammatically and in section specific embodiments of the process and apparatus embraced by this invention.

It has been stated previously that the foremost obstacle to the achievement of high efficiencies and a large number of theoretical stages in the extraction process and apparatus presently used in industry is the settling and separation step. According to this invention, it has been found that this obstacle can be overcome with the result that high efficiencies and a large number of theoretical stages can be obtained by employing two simple procedures which have heretofore not been appreciated by those who utilize extraction processes.

The first of these procedures is in part based upon the discovery that there is in every settling and separation zone a certain lateral kinetic energy in a horizontally flowing fluid mixture which hinders rapid settling and separation of the phases. In other words, as a fluid mixture of phases flows through the conventional horizontal settling and separation zone, the settling and separation of the phases is hindered and delayed to a considerable extent due to the fact that the horizontally moving stream of phases has a certain tendency to not only move in a forward direction but also in a sidewise or lateral direction. This lateral movement of the forwardly moving stream has a certain kinetic energy which creates turbulence and remixing of the phases. It has been found according to this invention that, if the forward moving stream of phases in the settling and separation zone is regulated in such a manner as to partially restrict the lateral movement of the fluid mixture of phases, more rapid settling and separation of the phases can be achieved.

This partial restriction of the lateral movement of the fluid mixture of phases also greatly increases the rate at which the material may be charged to the extraction unit. This partial lateral restriction can be accomplished by any suitable means, but it is mandatory that the means employed shall not restrict the vertical movement of the phases in the settling and separation zone, since any means employed to restrict the vertical movement of the phases will defeat or diminish greatly the beneficial effect obtained by restricting the lateral movement of the phases.

Although this lateral restriction of the phases in the settling and separation zone results in greatly improved operation, another factor of great importance must also be taken into consideration if optimum efficiency is to be attained in the phase separation operation. This factor is the manner in which the upper and lower phases are withdrawn from the settling and separation zone after the fluid mixture has separated into an upper and lower phase. The manner in which the separated phases are withdrawn is extremely important since even if perfect settling and separation occurs in the settling and separation zone, remixing and contamination of the separated phases will occur if certain precautions are not observed. It has been found, according to this invention, that partial remixing of the separated phases due to eddy turbulence at the interface of said two phases can be avoided by maintaining the upper and lower phases in substantially non-turbulent streamline flow until each of said phases has reached a certain point above or below the upper or lower surface of the upper or lower phases in the settling and separation zone, as the case may be. A more detailed and exact explanation of this aspect of the invention will be set forth in the following paragraphs.

The novel and highly efficient phase separation process of this invention and apparatus therefor may be best described with reference to the attached drawings in which.

In each figure of the drawings where like numerals designate like parts, 1 represents an inlet for a mixture of phases which opens into a main settling and separation zone wherein the mixture of phases is sub-divided into a plurality of smaller settling and separation zones by one or more vertically disposed partitions, plates, or membranes 3. While said mixture of phases is flowing through each of said smaller settling and separation zones, and after said phases have left said smaller settling and separation zones, the two phases gradually separate into an upper and lower phase. The upper phase is withdrawn through an upper outlet 4 and the lower phase is withdrawn through a lower outlet 5.

Figure 1:
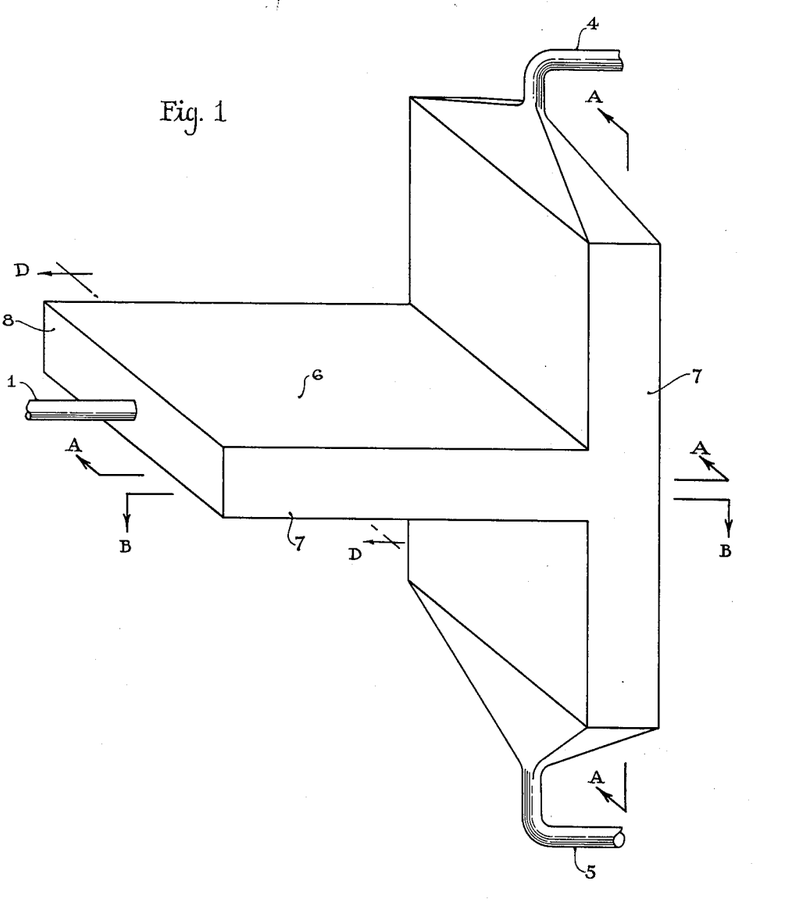
Figure 1 is a three-dimensional drawing of one embodiment of the invention.
Figures 2, 2A:
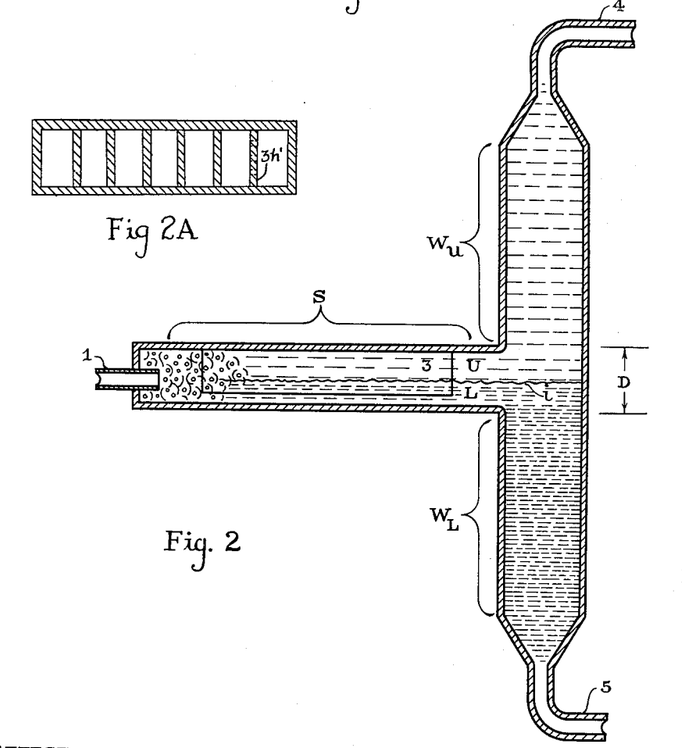
Figure 2 is a vertical section view taken on line A—A—A of Figure 1.
Figure 2A is an additional embodiment of the invention shown as a vertical view taken on line D—D of Figure 1.
Figure 3:
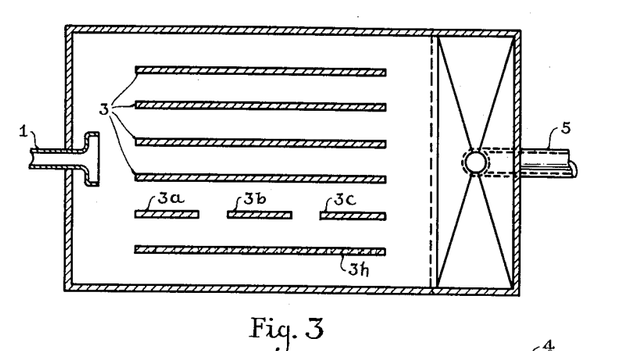
Figure 3 is a horizontal sectional view taken on line B—B of Figure 1.

Although the above description aptly indicates in broad outline the manner in which a mixture of phases is introduced, settled, separated and withdrawn in each figure of the drawings, a more detailed and exact understanding of this invention can be obtained when the invention is specifically described in relation to the embodiment illustrated by Figures 1, 2, and 3. Although I have chosen to illustrate the exact mechanism and theory of my invention by reference to Figures 1, 2, and 3, it should be clearly understood that my novel process is by no means limited to these figures but applies equally to Figures 4 to 12.

Referring now specifically to the embodiment represented by Figures 1, 2, and 3, a fluid mixture of phases having different specific gravities is introduced through inlet 1. Prior to entering inlet conduit 1, the phase mixture can, if desired, be thoroughly mixed and dispersed in one another by pumps, baffles, agitators or any other type of mixing, agitating, or dispersing equipment. Alternatively, the phase mixture may be thoroughly mixed at some point in the inlet conduit itself by means of baffles, orifices, etc., disposed in the interior of the inlet conduit. In order to simplify the drawings, only one inlet conduit has been shown in Figures 1, 2, and 3, but it must be realized that my novel process and apparatus is by no means limited to any specific number of inlets. As many inlet conduits may be employed as is compatible with good engineering design practice. Similarly, the shape or configuration of the inlet means may be varied widely without departing from the scope of this invention.

The phase mixture leaving inlet 1, passes into a main separation and settling zone which in Figure 1 is roughly defined by the substantially rectangular box-like space bounded on the top by a substantially horizontal plate 6, on the sides by a vertical plate 7, and on the end by a vertical plate 8. This zone is shown as a rectangular box-like section in Figure 1 for the purpose of clarity of presentation, but it must be recognized that this shape can be modified to a considerable degree without departing from my invention. For instance, the inlet portion of the settling and separation zone can be modified or tapered so that instead of having a uniform cross-sectional area across the entire main settling and separation zone, the cross-sectional area can gradually increase to the desired extent in the inlet portion of the main settling and separation zone.

Referring again to Figures 1, 2, and 3, the above described main settling and separation zone S is divided into a plurality of smaller settling and separation zones by one or more vertically disposed planar partition means or plates 3 which are, for the most part, aligned in such a manner as to offer the least possible resistance to the forward passage of the two phases through the unit. Stated in another way, these plates are substantially parallel to the axial direction of flow of the two phases through the main settling and separation zone. These plates limit and reduce to a great extent the lateral movement of the two phases in the main settling and separation zone. However, the vertically disposed plates do not in any way interfere or restrict vertical relative movement of the two phases in the main settling and separation zone.

The number of these plates within a main settling and separation zone depends upon the size and shape of the apparatus employed as well as process considerations which will subsequently be discussed in greater detail. Also, instead of a group of parallel plates which extend for substantially the full length of the main separation and settling zone, as do the plates 3 in Figures 1, 2, and 3, a series of vertical plates of shorter length may be employed in certain instances. One such alternative arrangement of vertically disposed plates is illustrated by the shorter plates 3a, 3b, and 3c in Figure 3.

These plates may, in some cases, be perforated as illustrated by perforated plates 3h and 3h' in Figure 3 and Figure 2A, respectively, so as to not completely shut off communication between the adjacent smaller settling and separation zones. The plates shown in Figures 2 and 3 are fastened to the upper plate 6 of the main settling and separation zone and extend vertically downward to within a short distance of the bottom of the main settling and separation zone. Although these plates have been shown in the drawings as not touching or fastened to the bottom of the main settling and separation zone, the plates may be fastened to the bottom of the main settling and separation zone as shown in Figure 2A as an additional embodiment of the invention. Numerous alternative arrangements can be devised for placing these plates within the main settling and separation zone as by welding, bolting, suspending with hooks or rods, etc. In fact, these plates may be placed and fastened in any desired manner within the settling and separation zone, the only requirement being that these plates perform the function of partially restricting the lateral movement of the phases without interfering with vertical movement of the phases.

The number of plates which should be used in each case will, of course, depend to a large extent upon the particular phases which are to be separated, the size of the main settling and separation zone, and the overall charge rate which one desires to pass through the extraction unit. As a general rule, it can be said that a sufficient number of lateral movement restriction means must be employed within the main settling and separation zone to restrict the lateral movement of the phases to such an extent that the phases will at least leave the settling and separation zone in substantially non-turbulent streamline flow, although it is, of course, preferable that the phases be in non-turbulent streamline flow for a substantial portion of the main settling and separation zone. Thus, the number of lateral movement restriction means may be calculated beforehand or determined experimentally after the unit has been constructed and is in operation. Calculation beforehand would involve the use of the well known fluid-flow formulas governing streamline and turbulent flow. Experimental determination of the number of lateral movement restriction means necessary to provide substantially non-turbulent streamline flow could be accomplished by progressively increasing the number of said restriction means within the main settling and separation zone until the desired condition is achieved. The latter expedient is extremely easy to employ.

Referring once more to Figures 1, 2, and 3, it will be seen that there is a section between the outlet of the main settling and separation zone and the outlet conduits 4 and 5. The space defined by this section comprises that which can be aptly described as the phase withdrawal zone. The function of the phase withdrawal zone is to separately draw off the upper and lower phases which have become settled and separated from each other in the aforementioned main settling and separation zone. For the most part, this exceedingly important aspect of extraction processes has not been fully appreciated. For example, although the fluid mixture of phases charged to an extraction unit may be settled and separated from each other into an upper and lower phase in settling and separation zone in the most perfect manner conceivable, the overall efficiency of the process and purity of the end products of the process will depend largely upon the manner in which these phases are withdrawn from the extraction unit. More often than not, these phases are drawn off in such a manner that eddy turbulence is created at the interface of the upper and lower phases with the inevitable result that some of the lower phase material is remixed with the upper phase material to thereby contaminate the upper phase as the upper phase is withdrawn from the extraction unit or vice versa. This condition is highly undesirable and severely limits the efficiency obtainable in any given apparatus. Heretofore, about the only procedure employed to overcome this undesirable condition consisted in flowing the charge material through the unit at a greatly reduced rate so as to avoid as much eddy turbulence as possible. Obviously, such a solution to this vexing problem is not economically justifiable since it sacrifices incremental increases in product purity for greatly reduced flow rates per unit volume of apparatus or necessitates larger and more expensive apparatus for any given rate of flow.

It is part of this invention to substantially eliminate eddy turbulence at the interface of the upper and lower phases and thereby avoid contamination of the upper and lower phases with each other when these phases are being withdrawn from the unit by withdrawing each of the phases in a particular manner.

In essence, this withdrawal procedure comprises the idea of, after the fluid mixture of phases has become more or less separated into an upper and lower phase in the main settling and separation zone, separately withdrawing each of said phases in such a manner as to substantially avoid any partial remixing of said phases due to eddy turbulence at the interface of said two phases by maintaining the upper phase in substantially non-turbulent streamline flow until said upper phase has reached a point at least $\frac{1}{5}$ D above the upper surface of the upper phase in the outlet of the main settling and separation zone, maintaining the lower phase in substantially non-turbulent streamline flow until said lower phase has reached a point at least $\frac{1}{5}$ D below the lower surface of the lower phase in the outlet of the main settling and separation zone, and withdrawing the upper phase above said upper point and withdrawing the lower phase below said lower point, wherein D is the combined vertical height of both phases at the outlet of the main settling and separation zone.

This part of the invention will become clearer after referring to Figures 2 and 3. In Figure 2, the letter "$i$" designates the interface between an upper phase U and a lower phase L, said phases having been previously settled in the main settling and separation section designated by the letter S. This interface can be maintained at any desired level within the unit by means of liquid level control means which are well known and extensively used in the extraction art.

The upper phase U flows toward the upper outlet 4 and the lower phase L flows toward the lower outlet 5. It has heretofore not been realized that the manner in which these phases are withdrawn has an extremely important effect upon the purity of the phases. For example, if the upper or lower phase is withdrawn in such a manner that eddy turbulence is created at the interface of the two phases, some of the upper phase material will be mixed with the lower phase material and vice versa with the inevitable result that the upper phase will be contaminated with a portion of the lower phase and the lower phase will be contaminated with a portion of the upper phase. It has been found, according to this invention, that the highly undesirable eddy turbulence and remixing of the phases at the interface can be substantially eliminated if the flow rates in the withdrawal zone are regulated in a particular manner. More particularly, the eddy turbulence and remixing can be avoided if the upper phase U is maintained in non-turbulent streamline flow until the upper phase has reached a point at least $\frac{1}{5}$ D above the upper surface of the upper phase in the main settling and separation section, and until the lower phase has reached a point at least $\frac{1}{5}$ D below the lower surface of the lower phase in the main settling and separation section. As is shown in the drawings, D is the combined vertical height of the phases in the outlet of the main settling and separation section. Although the upper or lower phase can be withdrawn at a point immediately beyond the above specified $\frac{1}{5}$ D distance if non-turbulent streamline flow is maintained for a distance of $\frac{1}{5}$ D above the said upper surface or below the lower surface, in nearly all cases it has been found preferable to place the withdrawal conduit some distance beyond the specified ⅓ D distance, usually at least ⅔ D above the ⅓ D distance, in order to obtain the minimum contamination due to remixing of the phases when the extraction unit is used for a wide variety of charge stocks and solvents as well as flow rates and to guard against the inevitable surging and flooding conditions which occasionally will occur in any extraction unit. The maintenance of streamline flow for the specified ⅓ D distance may be accomplished by a variety of procedures such as (1) decreasing the overall flow rate through the unit; (2) increasing the number of the lateral restriction means in the main settling and separation zone; (3) placing the phase outlet conduit at a greater distance from the upper or lower surface of the phases in the main settling and separation zone, etc.

Maintenance of the desired non-turbulent streamline flow in the specified ⅓ D distance will be tremendously facilitated by designing the withdrawal zone so that the cross-sectional area of each phase (as measured in a plane perpendicular to the axial direction of flow) will be substantially constant or gradually increasing from the outlet of the main settling and separation zone to a point in the withdrawal zone beyond the specified ⅓ D distance.

Thus, if it is known that the interface between the upper and lower phases at the outlet of the main settling and separation zone will be midway between the top and bottom of the main settling zone, the cross-sectional area of the upper withdrawal zone $W_u$ (as measured in a plane perpendicular to the axial direction of flow) can be designed so that it is at least as great as the cross-sectional area of the upper phase U in the main settling and separation zone. The cross-sectional area of the lower withdrawal zone $W_l$ could be calculated in a similar manner.

However, when designing an extraction unit which will handle a variety of charge stocks and wherein the interface may occasionally be very near the bottom of the main separation and settling zone and at other times very near the top of the main settling and separation zone, it is preferable that the cross-sectional area of the lower withdrawal zone and the upper withdrawal zone be equal to or greater than the cross-sectional area of the entire main settling and separation zone.

Although in Figures 1, 2, and 3, the apparatus is illustrated in the form of rectangular box-like sections, it should be understood that this has been shown in this manner for the purpose of illustrating and describing this invention in the simplest possible manner and the apparatus can obviously be modified and streamlined in numerous ways consistent with the teachings of this invention. For instance, all of the corners and the portions of the withdrawal zone adjacent each outlet conduit can be curved so as to minimize as much as possible any possible causes of swirling or eddy turbulence.

In order to illustrate the highly unexpected and novel results which can be obtained by following the teachings of my invention, the following experimental work is presented.

The apparatus employed for the first series of experiments was similar to that shown in Figures 1, 2, and 3 with the exception that the entire unit was constructed of tubular sections of glass having a 45 millimeter internal diameter. The main settling and separation zone was 12 inches long and the upper and lower phase withdrawal zones extended six inches above and below the outlet of the horizontally disposed main settling and separation zone.

A charge stock was thoroughly mixed with a solvent and introduced into the inlet of the main settling and separation zone. The charge stock was a white oil of 325 S. S. U. vis./100° F. and the solvent consisted of 56.2% nitrobenzene, 31.3% isopropyl alcohol, 10.9% aniline, and 1.6% water. This particular solvent was chosen because the raffinate and extract solutions formed were considerably more difficult to deemulsify than any combination likely to be encountered commercially, and observation of the entire process in the glass equipment at 65° F. was comparatively easy as the raffinate solution was colorless while the extract solution was a dark red color. The mixture flowed into the horizontally disposed main settling and separation section at a uniform rate and the raffinate and extract solutions were separately withdrawn at opposite ends of the phase withdrawal zone. The upper and lower layers were separately collected in graduates and after long settling at a constant temperature of 65° F., a measurement was made of the amount of extract solution in the completely settled raffinate solution and of the amount of raffiniate solution in the completely settled extract solution. In each of the three runs listed below, the interface between the upper and lower phases was about midway between the top and bottom of the unit.

RUN NO. 1

(a) No structure whatsoever in main settling and separation zone.
(b) Percent contamination of raffinate solution by extract solution=180%.
(c) Percent contamination of extract solution by raffinate solution=20%.
(d) Maximum charge rate=2,720 ml./hr.

RUN NO. 2

(a) Main settling and separation section contained two racks of 3 inch long stainless steel tubes located at opposite ends of the main settling and separation zone. These steel tubes were .0625 inches I. D. and .160 O. D. and each rack had enough of these steel tubes to cover the entire cross-sectional area of the larger glass tube.
(b) Per cent contamination of raffinate solution by extract solution=0.0%.
(c) Per cent contamination of extract solution by raffinate solution=0.0%.
(d) Maximum charge rate consistent with 0.0% contamination=23,750 ml./hr.

RUN NO. 3

(a) Two racks of parallel vertical glass microscope slides 3 inches long, 1 inch high, and 1/24 inch in thickness were spaced apart at 0.1 inch intervals in the main settling and separation zone, each rack being located at opposite ends of said zone.
(b) Per cent contamination of raffinate solution by extract solution=0.0%.
(c) Per cent contamination of extract solution by raffinate solution=0.0%.
(d) Maximum charge rate consistent with 0.0% contamination=73,100 ml./hr.

From the above three representative runs, it can readily be appreciated that the instant invention provides a highly superior method and apparatus for effecting the separation of a fluid mixture of phases. Although the tubes employed in Run No. 2 gave better results than Run No. 1, these tubes plugged frequently and even when operating properly failed to achieve the high charge rates which were obtained in Run No. 3. The reason for the lower charge rate in Run No. 2 as compared to Run No. 3 is believed to be due to the fact that the tubes restricted vertical gravitational settling and separation of the two phases as well as promoting remixing and turbulence of the two phases at the outlet ends of these tubes.

In order to illustrate the importance of maintaining non-turbulent streamline flow for a distance of at least ⅕ D above the upper surface of the upper phase in the main settling and separation zone and for a distance of at least ⅕ D below the lower surface of the lower phase in the main settling and separation zone, a second series of experiments were carried out.

The apparatus employed in these experiments was somewhat similar to the apparatus shown in Figures 1, 2, and 3. However, the various sections of the unit were not rectangular, but instead were composed of glass tubing so as to permit observation of turbulence, etc. within the unit. No lateral restriction means were employed in the main settling and separation zone since the only purpose of these experiments was to demonstrate the importance of the conditions which must be maintained in the withdrawal zones. In the first set of runs, the diameter of the glass tubing was ½ inch, while in the second set of runs the diameter of the glass tubing was 1 inch. In both sets of runs, a fluid mixture of phases comprising a white oil of 325 S. S. U. vis./100° F. and a solvent consisting of 56.2% nitrobenzene, 31.3% isopropyl alcohol, 10.9% aniline, and 1.6% water was passed into a horizontally disposed main settling and separation zone at a temperature of 65° F. wherein an upper and lower layer were formed. The charge rate was 418 ml./hr., for the ½ inch I. D. glass tube unit and 1670 ml./hr. for the 1 inch I. D. glass tube unit. The upper and lower layers at the outlet of the horizontally disposed main settling and separation zone were passed to the phase withdrawal zone. The upper layer was removed at various distances above the upper surface of the upper layer at the outlet of the main settling and separation zone and the lower layer was removed at various distances below the lower surface of the lower layer at the outlet of the main settling and separation zone.

In each instance a certain visible amount of turbulence occurred from the point of withdrawal downwardly a certain distance below the point of withdrawal. The various notations made in the tables below are believed to be self-explanatory.

Table I

| Vertical Height of the Main Settling and Separation Zone (D) | Vertical Distance Between the Point of Withdrawal of the Upper Layer and the Point at which Turbulence Ceases Below the Point of Withdrawal of the Upper Layer | Vertical Distance Between the Point at which Turbulence Ceases Below the Point of Withdrawal of the Upper Layer and the Upper Surface of the Upper Layer in the Horizontal Settling and Separation Zone | Vertical Distance Between the Point of Withdrawal of the Upper Layer and the Upper Surface of the Upper Layer in the Main Settling and Separation Zone | Volume Percent Contamination of the Upper Layer by the Lower Layer |
|---|---|---|---|---|
| Inches: | | | | |
| 0.5 | | 0.00 D | 0.00 D | 181.0 |
| 0.5 | | 0.00 D | 0.25 D | 39.4 |
| 0.5 | | 0.00 D | 0.50 D | 18.0 |
| 0.5 | | 0.00 D | 0.75 D | 10.1 |
| 0.5 | 0.91 D | 0.09 D | 1.00 D | 3.5 |
| 0.5 | 0.89 D | 0.26 D | 1.15 D | 0.0 |
| 0.5 | 0.86 D | 0.39 D | 1.25 D | 0.0 |
| 0.5 | 0.84 D | 0.66 D | 1.50 D | 0.0 |
| 0.5 | 0.81 D | 0.94 D | 1.75 D | 0.0 |
| 0.5 | 0.79 D | 1.21 D | 2.00 D | 0.0 |
| 1.0 | | 0.00 D | 0.00 D | 167.0 |
| 1.0 | | 0.00 D | 0.25 D | 31.0 |
| 1.0 | | 0.00 D | 0.50 D | 17.1 |
| 1.0 | | 0.00 D | 0.75 D | 9.9 |
| 1.0 | .88 D | .12 D | 1.00 D | 3.0 |
| 1.0 | .86 D | .29 D | 1.15 D | 0.0 |
| 1.0 | .85 D | .40 D | 1.25 D | 0.0 |
| 1.0 | .83 D | .67 D | 1.50 D | 0.0 |
| 1.0 | .81 D | .94 D | 1.75 D | 0.0 |
| 1.0 | .78 D | 1.22 D | 2.00 D | 0.0 |

Table II

| Vertical Height of the Horizontal Settling and Separation Zone-D | Vertical Distance Between the Point at which Turbulence ceases above the Point of Withdrawal of the lower Layer and the Point of Withdrawal of the Lower Layer | Vertical Distance Between the Lower Surface of the Lower Phase in the Horizontal Settling and Separation Zone and the Point at which Turbulence ceases above the Point of Withdrawal of the Lower Layer | Vertical Distance Between the Lower Surface of the Lower Phase in the Horizontal Settling and Separation Zone and the Point of Withdrawal of the Lower Layer | Volume Percent Contamination of the Extract Phase by Raffinate Solution |
|---|---|---|---|---|
| Inches: | | | | |
| 0.50 | | 0.00 | 0.00 | 21.0 |
| 0.50 | | 0.00 | .25 | 10.0 |
| 0.50 | | 0.00 | .50 | 7.1 |
| 0.50 | | 0.00 | .75 | 4.9 |
| 0.50 | .97 D | 0.03 | 1.00 | .65 |
| 0.50 | .95 D | 0.20 | 1.15 | .00 |
| 0.50 | .92 D | 0.33 | 1.25 | .00 |
| 0.50 | .89 D | 0.61 | 1.50 | .00 |
| 0.50 | .86 D | 0.89 | 1.75 | .00 |
| 0.50 | .84 D | 1.16 | 2.00 | .00 |
| 1.00 | | 0.00 | 0.00 | 19.1 |
| 1.00 | | 0.00 | 0.25 | 9.9 |
| 1.00 | | 0.00 | 0.50 | 7.8 |
| 1.00 | | 0.00 | 0.75 | 4.4 |
| 1.00 | .95 D | 0.05 | 1.00 | 0.5 |
| 1.00 | .92 D | 0.23 | 1.15 | 0.0 |
| 1.00 | .90 D | 0.35 | 1.25 | 0.0 |
| 1.00 | .88 D | 0.62 | 1.50 | 0.0 |
| 1.00 | .85 D | 0.90 | 1.75 | 0.0 |
| 1.00 | .82 D | 1.18 | 2.00 | 0.0 |

From these tables, it can readily be seen that contamination occurred whenever turbulent non-streamline flow existed for a distance less than ⅕ D above the upper surface of the upper layer at the outlet of the main settling and separation zone or less than ⅕ D below the lower surface of the lower layer at the outlet of the main settling and separation zone. Similarly, contamination occurred whenever the point of withdrawal was less than 1.15 D above the upper surface of the upper layer at the outlet of the main settling and separation zone or less than 1.15 D below the lower surface of the lower layer at the outlet of the main settling and separation zone.

One can also see from these tables that any distance greater than the specified ⅕ D or 1.15 D gives no contamination so that a greater distance can always be utilized. In fact, when the unit is to be used under a wide variety of flow rates and charge stocks, it is usually wise to increase this distance so as to insure against undesirable surging and flooding conditions which inevitably occur in nearly any apparatus whose operation is in some manner or another dependent upon manual control.

Figure 4:
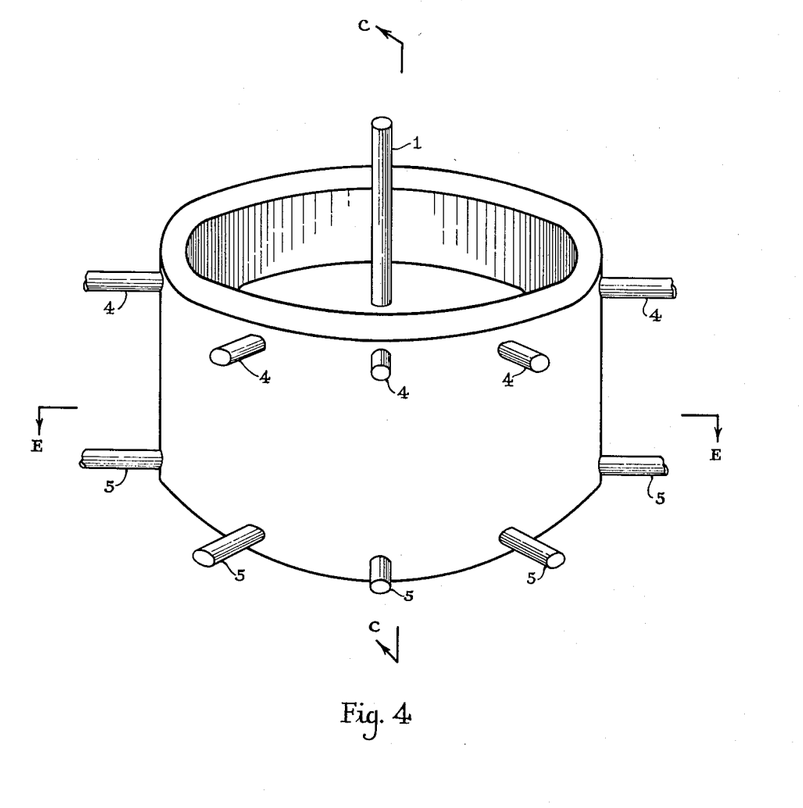
Figure 4 is a three dimensional drawing of another embodiment of the invention.
Figure 5:
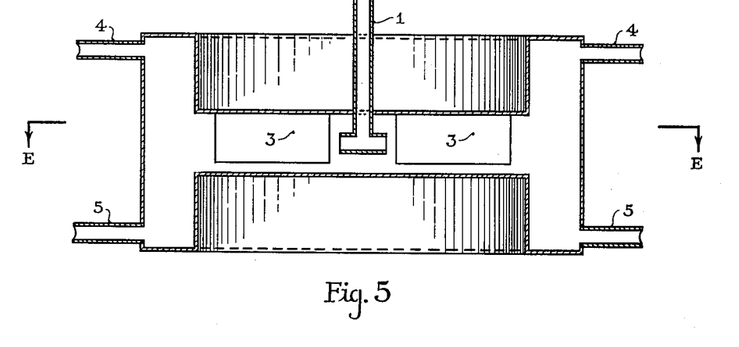
Figure 5 is a vertical sectional view taken on line C—C of Figure 4.
Figure 6:
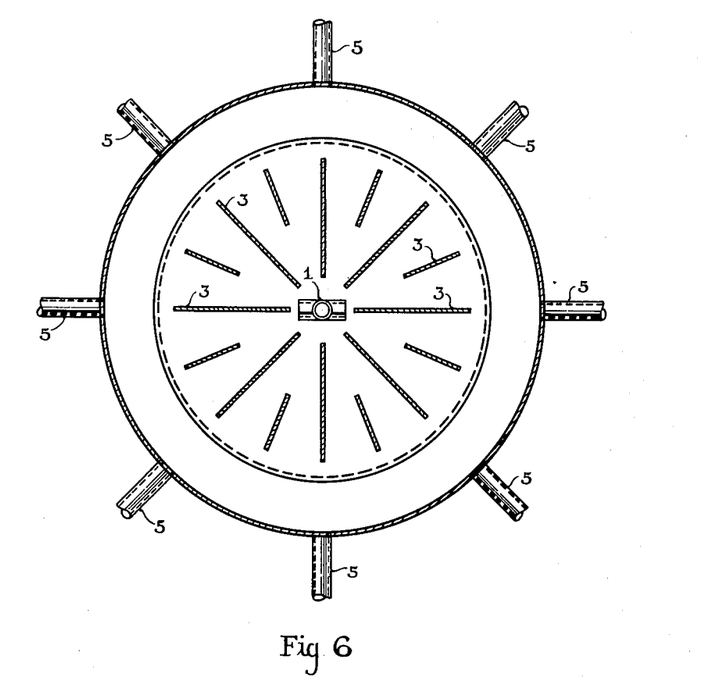
Figure 6 is a horizontal sectional view taken on line E—E of Figure 4.

Figures 4, 5, and 6 show another form of apparatus in which the instant novel process can be carried out. The fluid mixture of phases enters through inlet means 1 and is caused to flow radially in a substantially horizontal path past the lateral flow restriction means 3 toward the periphery of the unit at which point the upper phase is removed through upper outlet means 4 and the lower phase is removed through lower outlet means 5. It will be observed that the lateral restriction means 3 need not all be of the same length. The exact number and length of these radially disposed lateral restriction means 3 will obviously depend upon the size of the entire unit, the flow rates employed, and the particular fluid phase mixture charged to the unit, but in all cases, the number and length of these plates must be sufficient to restrict lateral movement of the phases to such an extent that non-turbulent streamline flow conditions so essential to rapid and efficient settling prevail before the phases reach the withdrawal zone. It will also be noted that the linear velocity of the fluid mixture of phases will progressively decrease from the inlet to the outlet of the main settling and separation zone. As was pointed out with reference to Figures 1, 2, and 3, it is necessary to maintain the upper layer in substantially non-turbulent streamline flow until said layer has reached a point at least ⅕ D above the upper surface of the upper layer in the main settling and separation zone and maintain the lower layer in substantially non-turbulent streamline flow until said layer has reached a point at least ⅕ D below the lower surface of the lower layer in the main settling and separation zone in order to avoid any partial remixing of the phases due to eddy turbulence at the interface of the two layers.

Figure 7:
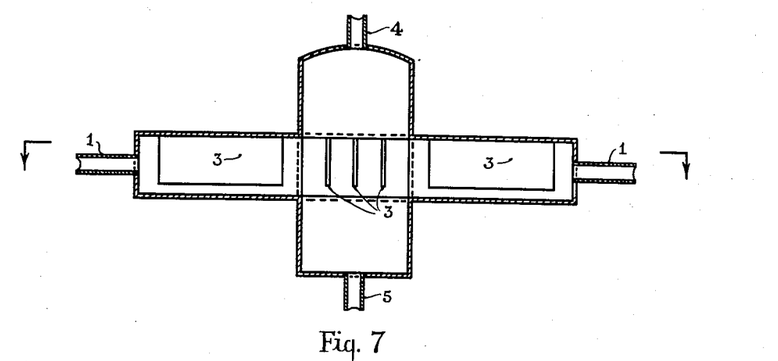
Figures 7 and 8 are vertical and horizontal sectional views respectively of a third embodiment of the invention.
Figure 8:
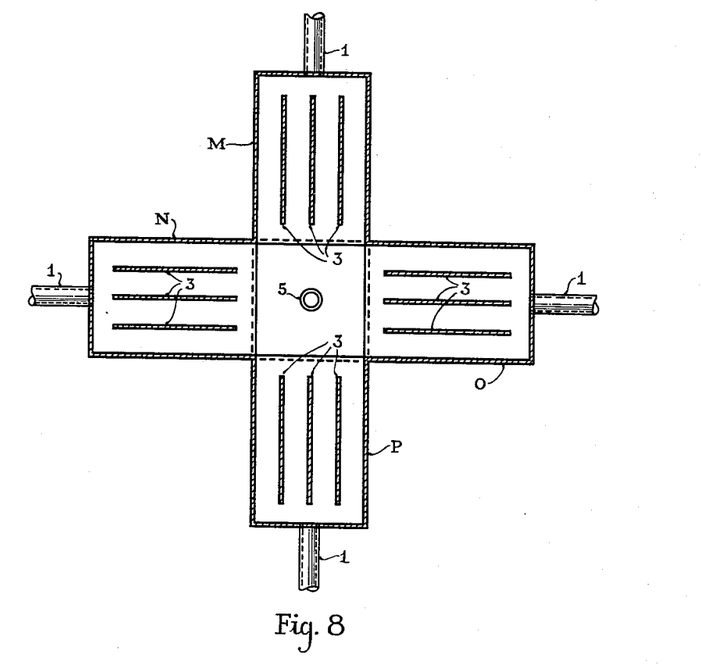

Figures 7 and 8 illustrate still another apparatus in which my novel process can be carried out. The fluid mixture of phases passes through the inlet means 1 into four main settling and separation zones designated as M, N, O, and P, each of said main settling and separation zones being divided into a plurality of smaller settling and separation zones by a number of lateral-flow restriction means 3. These lateral restriction means function in the same manner as those of Figures 1 to 6. Although four of these main settling and separation zones have been shown, a smaller or greater number can be used as desired. The outlet end of each main settling and separation zone opens into a single central withdrawal zone. The upper and lower layers leaving each of the main settling and separation zones are withdrawn through an upper outlet 4 and a lower outlet 5, respectively. The same considerations as to maintaining non-turbulent streamline flow for the specified ⅕ D distance mentioned in relation to Figures 1 to 6 likewise apply to Figures 7 and 8.

Figure 9:
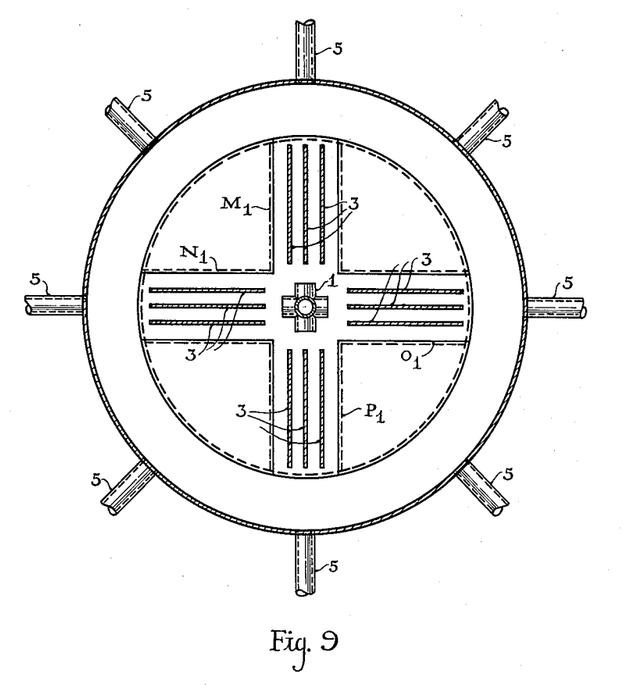
Figures 9 and 10 are vertical and horizontal sectional views respectively of a fourth embodiment of the invention.
Figure 10:
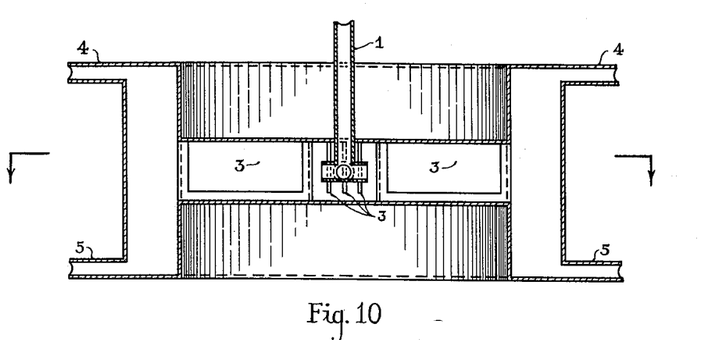

Figures 9 and 10 illustrate still another apparatus in which my novel process can be carried out. The fluid mixture of phases passes through the inlet means 1 into four main settling and separation zones designated as $M_1$, $N_1$, $O_1$, and $P_1$, each of said main settling and separation zones being divided into a plurality of smaller settling and separation zones by a number of lateral flow restriction means 3. These lateral restriction means function in the same manner as those in Figures 1 to 8. Although four of these main settling and separation zones have been shown, a greater or smaller number may be employed as desired. The outlet end of each main settling and separation zone opens into an outer peripheral withdrawal zone. The upper and lower layers leaving the main settling and separation zones are withdrawn through an upper outlet 4 and a lower outlet 5, respectively. The same considerations as to maintaining non-turbulent streamline flow for the specified 1/5 D distance mentioned in relation to Figures 1 to 8 likewise apply in Figures 9 and 10.

Figure 11:
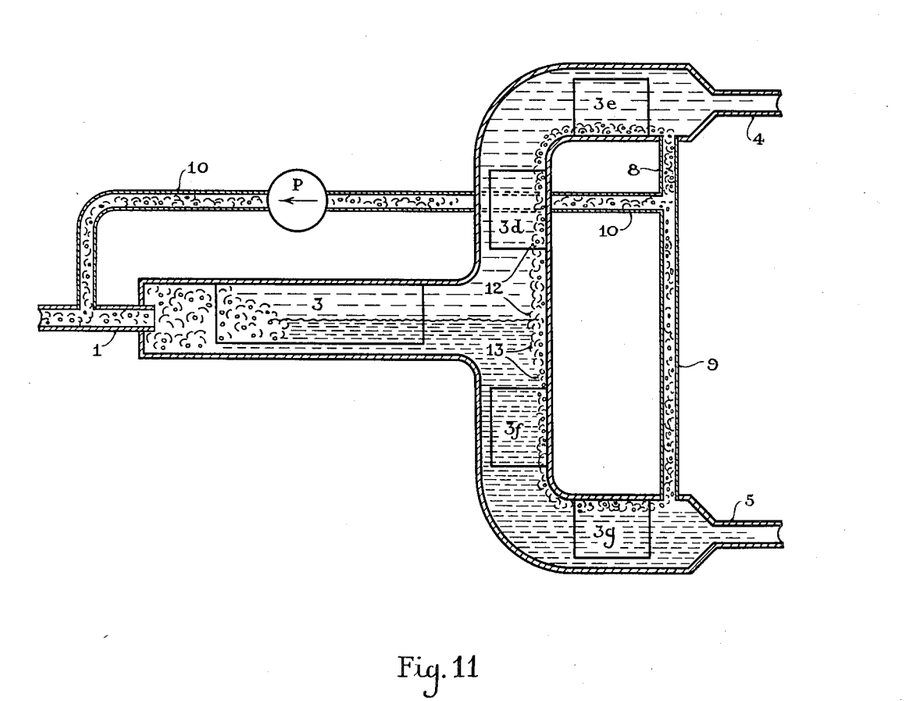
Figure 11 is a vertical sectional view of the fifth embodiment of the invention.

Figure 11 represents a further apparatus which may be utilized to carry out my novel process. Although this figure is essentially a modification of the embodiment shown in Figures 1, 2, and 3, the added novel features of this embodiment may be incorporated in any of the aforementioned Figures 4 to 10.

The modification shown in these figures is of particular importance and utility when it is necessary to separate a fluid mixture of phases which is exceedingly difficult to separate or of the type which has heretofore been considered to be practically impossible to separate by any known extraction method. This modification is also of particular value when the economic considerations of a particular extraction process dictate that the rate of flow of fluids through the unit must be in excess of that which has hereinbefore been set forth as the optimum flow conditions consistent with perfect separation of the phases. Referring to Figure 11, it will be seen that this embodiment differs from Figures 1, 2, and 3 in that the upper and lower phase withdrawal zones are modified to include further lateral flow restriction means $3d$, $3e$, $3f$, and $3g$, as well as an upper emulsion return line 8 and a lower emulsion return line 9 that merge into a common emulsion return line 10 which communicates with a point anterior to the inlet of the main settling and separation zone. Thus, when a fluid mixture of phases is encountered which is exceedingly difficult to separate, it is sometimes impossible to effect a perfect separation of the upper and lower phases in the phase withdrawal zone, with the result that some emulsion of the two phases 12 may flow upwardly in the upper withdrawal zone and some emulsion of the two phases 13 may flow downwardly into the lower phase withdrawal zone. The insertion of lateral flow restriction means $3d$ to $3g$ will cause the emulsion 12 to gravitate toward the lower portion of the upper phase withdrawal zone and the emulsion 13 to gravitate toward the upper portion of the lower phase withdrawal zone, whereby each of said emulsion layers can be easily removed from the upper or lower phase in which it is entrained by the aforementioned emulsion return lines and recycled back to the fluid mixture of phases which is to enter the main settling and separation zone. The lateral flow restriction means $3d$–$3g$ are so placed that they will restrict lateral movement of the phases in a plane perpendicular to the axial direction of flow but will not inhibit gravitational movement of the phases in a vertical direction.

Although Figures 1 to 11 represent single units for the separation of a fluid mixture of phases, actual utilization and application of the principles of this invention to a commercial extraction process would obviously involve a plurality of these units in combination in order to effect the desired results.

Figure 12:
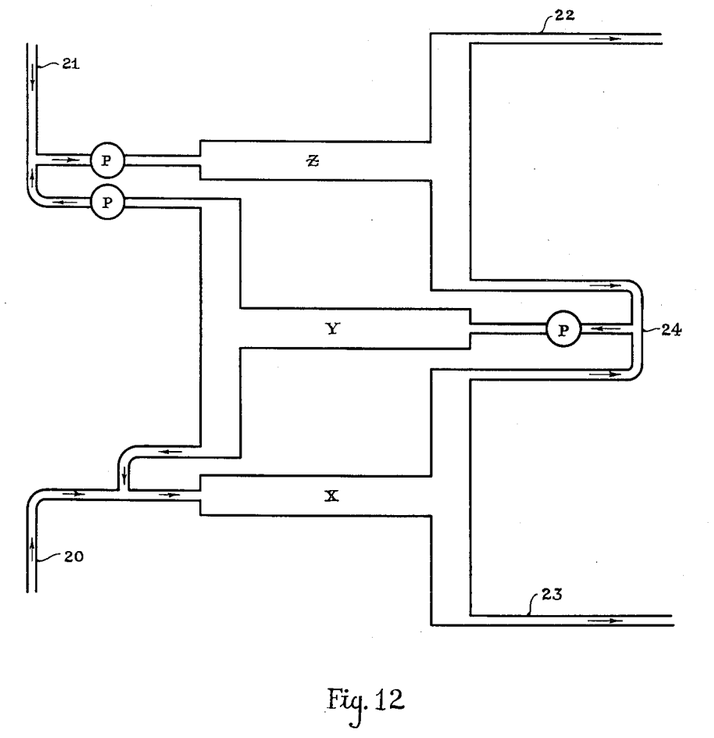
Figure 12 is a diagrammatic flow-type drawing showing a sixth embodiment of the invention.

Figure 12 is a very simple flow diagram type of illustration which shows how three of these units (similar to the unit shown in Figures 1, 2, and 3) could be combined to form a three-stage extraction apparatus. In Figure 12 the material to be treated is introduced at 20 and the solvent medium at 21. The final raffinate phase is withdrawn at 22 and the final extract phase withdrawn at 23. The extract phase from unit Z and the raffinate phase from unit X are mixed together at 24 and pass through unit Y. In general, it will be noted that the raffinate phase in each individual unit flows toward the inlet of the main settling and separation zone of the unit which is next closest to the ultimate raffinate phase withdrawal conduit while the extract phase flows toward the inlet of the main settling and separation zone of the unit which is next closest to the ultimate extract phase withdrawal conduit. In other words, the flow of the two phases in each unit will be substantially co-current but the overall flow through the plurality of units will be counter-current.

The selectivity and power of the solvent may be controlled in various parts of this apparatus by means of suitable heat exchange devices in or adjacent to one or more of the units; such procedures being well known in the extraction art. The solvent power and selectivity may also be further modified in a well known manner by the injection of an additive at one or more intermediate points in the extraction apparatus. Any number of these units can be combined and it is not necessary that every unit be of the same size as the other units. The units may be arranged in a vertical row, a horizontal row, or a combination of the two.

Fluid flow between the units is facilitated by the use of pumps located in the conduits. Since it is usually desirable to thoroughly mix the materials which are to enter a unit, agitators, mixers, baffles, or any other known type of mixing device can be employed.

While the foregoing specification sets forth the invention in specific terms, it is to be understood that numerous changes in shape, size and materials may be resorted to without departing from the scope of the invention.

I claim:

1. A method of continuously separating a liquid mixture containing at least two substantially immiscible phases of different specific gravities which comprises passing said liquid mixture in substantially horizontal turbulent non-streamline flow into a main settling and separation zone, wherein said liquid mixture is subdivided into a plurality of smaller settling and separation zones to thereby at least partially restrict the lateral movement of said phases without interfering with the vertical movement of said phases; and after said phases have become substantially separated into an upper and lower phase, separately withdrawing each of said phases to substantially avoid any partial remixing of said phases due to eddy turbulence at the interface of said two phases by maintaining the upper phase in substantially non-turbulent streamline flow until said upper phase has reached a point at least ⅕ D above the upper surface of the upper phase at the outlet of the main settling and separation zone, maintaining the lower phase in substantially non-turbulent streamline flow until said lower phase has reached a point at least ⅕ D below the lower surface of the lower phase at the outlet of the main settling and separation zone, and withdrawing the upper phase beyond said upper point and withdrawing the lower phase beyond said lower point, wherein D is the combined vertical height of both phases at the outlet of the main separation and settling zone.

2. A method of continuously separating a liquid mixture containing at least two substantially immiscible phases of different specific gravities which comprises passing said liquid mixture in substantially horizontal turbulent non-streamline flow into a main settling and separation zone, wherein said liquid mixture is sub-divided into a plurality of smaller settling and separation zones to thereby simultaneously (1) convert the turbulent non-streamline flow of the liquid mixture entering the main settling and separation zone into substantially streamline flow in each of said smaller settling and separation zones, and (2) at least partially restrict the lateral movement of said phases without interfering with the vertical movement of said phases; and after said phases have become substantially separated into an upper and lower phase, separately withdrawing each of said phases to substantially avoid any partial remixing of said phases due to eddy turbulence at the interface of said two phases by maintaining the upper phase in substantially non-turbulent streamline flow until said upper phase has reached a point at least ⅕ D above the upper surface of the upper phase at the outlet of the main settling and separation zone, maintaining the lower phase in substantially non-turbulent streamline flow until said lower phase has reached a point at least ⅕ D below the lower surface of the lower phase at the outlet of the main settling and separation zone, and withdrawing the upper phase beyond said upper point and withdrawing the lower phase beyond said lower point, wherein D is the combined vertical height of both phases at the outlet of the main separation and settling zone.

3. A process according to claim 2 wherein said smaller settling and separation zones are substantially parallel to each other.

4. A process according to claim 2 wherein the linear velocity of the liquid mixture of phases progressively decreases from the inlet to the outlet of the main settling and separation zone.

5. A process according to claim 2 wherein the linear velocity of the liquid mixture of phases is substantially the same between the inlet and outlet of the main settling and separation zone.

6. A method of continuously separating a liquid mixture containing at least two substantially immiscible phases of different specific gravities which comprises passing said liquid mixture in substantially horizontal turbulent non-streamline flow into a main settling and separation zone, wherein said liquid mixture is sub-divided into a plurality of smaller settling and separation zones to thereby simultaneously (1) convert the turbulent non-streamline flow of the liquid mixture entering the main settling and separation zone into substantially streamline flow in each of said smaller settling and separation zones, and (2) at least partially restrict the lateral movement of said phases without interfering with the vertical movement of said phases; thereby at least initiating spontaneous separation of the said phases in said smaller settling and separation zones; and after said phases have become substantially separated into an upper and lower phase, separately withdrawing each of said phases to substantially avoid any partial remixing of said phases due to eddy turbulence at the interface of said two phases by maintaining the upper phase in substantially non-turbulent streamline flow until said upper phase has reached a point at least ⅕ D above the upper surface of the upper phase at the outlet of the main settling and separation zone, maintaining the lower phase in substantially non-turbulent streamline flow until said lower phase has reached a point at least ⅕ D below the lower surface of the lower phase at the outlet of the main settling and separation zone, and withdrawing the upper phase beyond said upper point and withdrawing the lower phase beyond said lower point, wherein D is the combined vertical height of both phases at the outlet of the main separation and settling zone.

7. A method of continuously separating a liquid mixture containing at least two phases of different specific gravities into two separate phases which comprises passing said liquid mixture into a main settling and separation zone wherein said liquid mixture is sub-divided into a plurality of smaller settling and separation zones to thereby (1) insure non-turbulent streamline flow of the liquid mixture through the greater portion of the main settling and separation zone, and (2) at least partially restrict the lateral movement of said phases without interfering with the vertical movement of said phases; and after said phases have become substantially separated into an upper and lower phase, separately withdrawing each of said phases to substantially avoid any partial remixing of said phases due to eddy turbulence at the interface of said two phases by maintaining the upper phase in substantially non-turbulent streamline flow until said upper phase has reached a point at least ⅕ D above the upper surface of the upper phase at the outlet of the main settling and separation zone, maintaining the lower phase in substantially non-turbulent streamline flow until said lower phase has reached a point at least ⅕ D below the lower surface of the lower phase at the outlet of the main settling and separation zone, and withdrawing the upper phase beyond said upper point and withdrawing the lower phase beyond said lower point, wherein D is the combined vertical height of both phases at the outlet of the main settling and separation zone.

8. A method of continuously separating a liquid mixture containing at least two phases of different specific gravities into two separate phases which comprises passing said liquid mixture into a main settling and separation zone wherein said liquid mixture is subdivided into a plurality of smaller settling and separation zones to thereby (1) insure non-turbulent streamline flow of the liquid mixture through the greater portion of the main settling and separation zone, and (2) at least partially restrict the lateral movement of said phases without interfering with the vertical movement of said phases; and after said phases have become substantially separated into an upper and lower phase, separately withdrawing each of said phases to substantially avoid any partial remixing of said phases due to eddy turbulence at the interface of said two phases by maintaining the upper phase in substantially non-turbulent streamline flow until said upper phase has reached a point at least ⅕ D above the upper surface of the upper phase at the outlet of the main settling and separation zone and withdrawing said upper phase at a point at least 1 D above the upper surface of the upper phase at the outlet of the main settling and separation zone, maintaining the lower phase in substantially non-turbulent streamline flow until said lower phase has reached a point at least ⅕ D below the lower surface of the lower phase at the outlet of the main settling and separation zone, and withdrawing the lower phase at a point at least 1 D below the lower surface of the lower phase at the outlet of the main settling and separation zone, wherein D is the combined vertical height of both phases at the outlet of the main settling and separation zone.

9. An apparatus for separating a liquid mixture containing at least two phases comprising at least one main settling and separation chamber, the inlet section and outlet section of each chamber being located at the opposite horizontal ends of each chamber, each of said chambers containing a plurality of planar partition means which are generally disposed within a substantially vertical plane between the inlet section of each chamber and the outlet section of each chamber, a main withdrawal chamber in open communication with the outlet section of each main settling and separation chamber, said main withdrawal chamber comprising an upper withdrawal section which extends for a distance of at least 1.00 D above the upper boundary of the main settling and separation chamber to an upper outlet means, and a lower withdrawal section which extends for a distance of at least 1.00 D below the lower boundary of the main settling and separation chamber to a lower outlet means, wherein D is the vertical height of the main settling and separation chamber at a point adjacent the outlet section of the main settling and separation chamber.

10. An apparatus according to claim 9 wherein the planar partition means are substantially parallel to each other.

11. An apparatus according to claim 9 wherein the planar partition means are disposed in a configuration similar to the radii of a circle.

12. An apparatus according to claim 9 wherein at least one of said withdrawal sections contains a plurality of planar partition means disposed within a substantially vertical plane which passes through the inlet and outlet portions of said withdrawal section.

13. An apparatus according to claim 12 wherein at least one of said withdrawal sections contains a second outlet means located between the partition means in the withdrawal section and the main outlet from said withdrawal section.

14. An apparatus according to claim 9 wherein the cross-sectional area of each withdrawal section is at least as great as the average cross-sectional area of the main settling and separation chamber, said cross-sectional areas being measured respectively in a plane perpendicular to a line drawn between the inlet and outlet portions of said withdrawal section, and between the inlet and outlet section of said main settling and separation chamber.

References Cited in the file of this patent

UNITED STATES PATENTS

| | | |
|---|---|---|
| 1,516,132 | Allen et al. | Nov. 18, 1924 |
| 1,864,911 | Jodeck | June 28, 1932 |
| 2,375,590 | Schonberg et al. | May 8, 1945 |
| 2,497,392 | Brenkel | Feb. 14, 1950 |
| 2,541,071 | Jones et al. | Feb. 13, 1951 |